United States Patent

[11] 3,634,052

[72] Inventors Paul Y. C. Gee
 Woodbury;
 Harry J. Andress, Jr., Pitman, both of N.J.
[21] Appl. No. 718,366
[22] Filed Apr. 3, 1968
[45] Patented Jan. 11, 1972
[73] Assignee Mobil Oil Corporation

[54] LIQUID PETROLEUM HYDROCARBON COMPOSITIONS CONTAINING ESTERS OF AN ALKYL ITACONATE-MALEIC ANHYDRIDE COPOLYMER AS FLUIDITY IMPROVERS
7 Claims, No Drawings

[52] U.S. Cl.................................................. 44/62, 44/70
[51] Int. Cl.................................................. C10l 1/18
[50] Field of Search.......................................... 44/62, 70; 252/56

[56] References Cited
UNITED STATES PATENTS

| | | | |
|---|---|---|---|
| 2,615,845 | 10/1952 | Lippencott et al............ | 44/62 X |
| 3,087,893 | 4/1963 | Agius et al.................. | 44/62 X |
| 3,222,282 | 12/1965 | Berkowitz et al............ | 44/62 X |

Primary Examiner—Daniel E. Wyman
Assistant Examiner—W. J. Shine
Attorneys—Oswald G. Hayes, Andrew L. Gaboriault, Raymond W. Barclay and Benjamin I. Kaufman ABSTRACT: Liquid petroleum hydrocarbon compositions are provided which contain small amounts, sufficient to improve their fluidity characteristics, of an ester of an alkyl itaconate-maleic anhydride copolymer. A method for preparing these ester copolymers is also provided.

LIQUID PETROLEUM HYDROCARBON COMPOSITIONS CONTAINING ESTERS OF AN ALKYL ITACONATE-MALEIC ANHYDRIDE COPOLYMER AS FLUIDITY IMPROVERS

BACKGROUND OF THE INVENTION

1. Field of the Invention

This invention relates to improved liquid hydrocarbon compositions, and in one of its aspects relates, more particularly, to liquid hydrocarbon compositions having improved fluidity characteristics. Still more particularly, in this aspect, the invention relates to liquid hydrocarbon compositions containing certain ester copolymers which are effective in functioning as pour point depressants and fluidity improvers, particularly in such liquid hydrocarbon compositions as crude oils and petroleum residual oils.

2. Description of the Prior Art

Prior to the present invention, various materials have been suggested by the prior art as fluidity improvers in liquid hydrocarbons. In this respect, it has been found that such fluidity improvers have not proved entirely satisfactory with regard to improving the fluidity characteristics of liquid hydrocarbons where the hydrocarbons to be treated boil over a wide range. Furthermore, some fluidity improvers have proved effective in certain types of oils, while exhibiting more limited improvement in other types. More specifically, the ability to employ a fluidity improver in liquid hydrocarbons which boil, for example, within the range from about 75° F. to about 1,000° F. and which are also effective in various types of oils, for example, crude oils or petroleum residual oils, is most desirable.

SUMMARY OF THE INVENTION

It has now been found, as more fully hereinafter described, that liquid hydrocarbon compositions cab be provided possessing improved fluidity characteristics, by incorporating therein relatively small amounts of certain ester copolymers. These polymeric materials comprise esters of an alkyl itaconate-maleic anhydride copolymer. In accordance with the invention, these ester copolymers can be effectively employed in the liquid hydrocarbon compositions as pour point depressants and fluidity improvers in an amount from about 0.001 percent to about 5 percent, and preferably from about 0.05 percent to about 0.5 percent, by weight, of the total weight of the liquid hydrocarbon compositions. Preferred ester copolymers are those in which the ester portion of the copolymer contains at least about 20, and more preferably from about 20 to about 24 carbon atoms, and in which the alkyl portion of the copolymer contains at least about 20, and more preferably from about 20 to about 24 carbon atoms. Particularly desirable ester copolymers are those selected from the group consisting of the dibehenyl ester of dibehenyl itaconate-maleic anhydride copolymer, the di-Alfol 20T ester of dibehenyl itaconate-maleic anhydride copolymer, the di-Alfol 22 ester of di-Alfol 22 itaconate-maleic anhydride copolymer and the di-Alfol 2022T ester of dibehenyl itaconate-maleic anhydride copolymer, as more particularly hereinafter described.

The liquid hydrocarbons improved in accordance with the present invention may comprise any hydrocarbons in which fluidity improvement is desirable. A field of specific applicability, in accordance with the present invention, is in the improvement of liquid hydrocarbons boiling at a temperature from about 75° F. to about 1,000° F. Of particular importance is the treatment of petroleum distillate oils which have pour and flow points above about 75° F. and which boil as high as about 750° F. or higher. It should be noted, in this respect, that the term "distillate oils" is not intended to be restricted to straight run distillate fraction. The distillate oils can be straight run distillate, catalytically or thermally cracked (including hydrocracked distillate oils) or mixtures of straight run distillate oils, naphthas and the like, with cracked distillate stocks. Moreover, such oils can be treated in accordance with well-known commercial methods, such as acid or caustic treatment, hydrogenation, solvent refining, clay treatment, and the like.

The distillate oils are characterized by their relatively low viscosity, pour point and the like. The principal property which characterizes these hydrocarbons, however, is their distillation range. As hereinbefore indicated, this range will preferably lie between about 75° F. and about 1,000° F. Obviously, the distillation range of each individual oil will cover a narrower boiling range falling, nevertheless, within the above-mentioned limits. Likewise, each oil will boil substantially and continuously throughout its distillation range.

As hereinbefore indicated, the liquid hydrocarbon composition improved in fluidity characteristics through the use of the ester copolymers of the present invention have broad applicability to liquid hydrocarbon compositions in the form of crude oils or petroleum residual oils. Thus, the fluidity characteristics of very high wax containing petroleum residual oils, such as the residuum of North African crude oils designated as Zelten, or similar petroleum oils which boil above approximately 650° F. and have pour points above 75° F. have broad applicability. Another specific type of crude oil to which the present invention also has broad applicability is the Amal crudes.

As previously described, the novel fluidity improvers of the present invention comprise esters of an alkyl itaconate-maleic anhydride copolymer. The preparation of these ester copolymers is, in general, carried out by copolymerizing 1 mole of an alkyl itaconate with 1 mole of maleic anhydride at a temperature from about 75° C. to about 175° C., preferably in the presence of an organic peroxide catalyst, for example, ditertiary butyl peroxide or benzoyl peroxide, or other suitable polymerization catalysts, in an amount sufficient to permit copolymerization to take place. Small amounts of the catalyst are usually sufficient for such purposes, for example, amounts from about 1 percent to about 10 percent, by weight, of the polymerization mixture. The copolymer thus obtained, is then reacted with 1 or 2 moles of an alcohol to form the corresponding ester of the alkyl itaconate-maleic anhydride copolymer.

The following equations will serve to illustrate the formation of some of the aforementioned preferred ester copolymers, as fluidity improvers.

(1) Alkyl itaconate-maleic anhydride copolymers

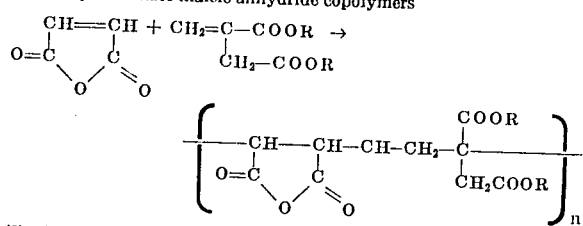

(2) Esters of alkyl itaconate-maleic anhydride copolymers (a) with one mole of alcohol

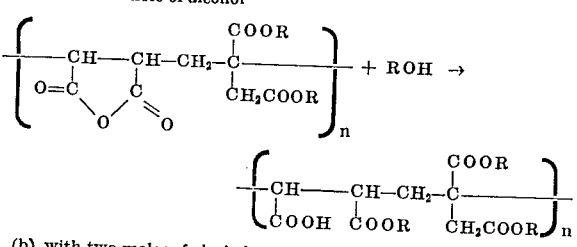

(b) with two moles of alcohol

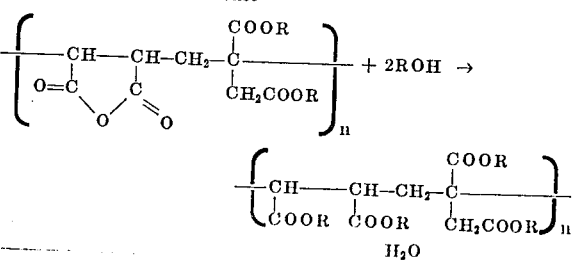

R = an alkyl group from behenyl alcohol or Alfol alcohols.

As hereinbefore indicated, the preferred ester copolymers are those in which the ester and alkyl portion of the copolymer contain at least about 20, and more preferably from about 20 to about 24 carbon atoms.

DESCRIPTION OF SPECIFIC EMBODIMENTS

The following data and examples will serve to illustrate the preparation of the novel ester copolymers of the present invention and their efficacy in improving the fluidity characteristics of liquid hydrocarbon compositions. It will be understood, however, that is is not intended the invention be limited to the particular ester copolymers or the particular liquid hydrocarbon compositions, described. Various modifications of these compositions, as previously indicated, can be employed and will be readily apparent to those skilled in the art.

The preferred alcohols employed for the preparation of the aforementioned ester copolymers are behenyl alcohol, Alfol 20T alcohol, Alfol 22 alcohol, and Alfol 2022T alcohol.

The behenyl alcohol is a commercially available mixture containing, by weight, 0.3 percent 1-hexadecanol, 15.8 percent 1-octadecanol, 14.8 percent 1-eicosanol, 68 percent 1-docosanol, and 0.9 percent 1-tetracosanol.

The Alfol 20T alcohol is a mixture containing, by weight, 8 percent 1-octadecanol, 73 percent 1-eicosanol, 10 percent 1-docosanol, and 2 percent 1-tetracosanol.

The Alfol 22 alcohol is a mixture containing, by weight, 2 percent 1-eicosanol, 94 percent 1-docosanol and 1 percent 1-tetracosanol.

The Alfol 2022T alcohol is a mixture containing, by weight, 2 percent 1-octadecanol, 63 percent 1-eicosanol, 25 percent 1-docosanol and 2 percent 1-tetracosanol.

EXAMPLE 1

A mixture of 94.25 grams (0.125 mole) of dibehenyl itaconate, 12.25 grams (0.125 mole) of maleic anhydride and 5.33 grams (5 percent) of di-t-butyl peroxide was gradually heated with stirring. Heat was shut off at 135° C. The reaction was exothermic, and the temperature rose rapidly to 155° C. and then dropped. The mixture became quite viscous and the reaction was immediately discontinued. To the above copolymer were added 83 grams (0.25 mole + 4 grams excess) of behenyl alcohol, 9.4 grams (5 percent) of p-toluene sulfonic acid and 150 cc. of xylene. The mixture was refluxed at 145° C. until water almost stopped coming over, then gradually heated to 175° C. and held at 175° C. until water stopped completely coming over. The reaction product was diluted with benzene, filtered and topped to 175° C. at 8 mm. of mercury. The final product, the dibehenyl ester of dibehenyl itaconate-maleic anhydride copolymer, was waxy at room temperature.

EXAMPLE 2

A mixture of 94.25 grams (0.125 mole) of dibehenyl itaconate, 12.25 grams (0.125 mole) of maleic anhydride, 5.30 grams (5 percent) of di-t-butyl peroxide and 20 cc. of toluene was gradually heated with stirring. The mixture became very viscous when the temperature rose to 147° C. To the above copolymer were added 84 grams (0.25 mole + 8 grams excess) of Alfol 20T alcohol, 9.5 grams (5 percent) of p-toluene sulfonic acid and 200 cc. of xylene. The mixture was refluxed at 145° C. for 3 hours and at 175° C. for 2 hours until water stopped coming over. The reaction product was diluted with benzene, filtered and topped to 175° C. at 8 mm. The final product, the di-Alfol 20T ester of dibehenyl itaconate-maleic anhydride copolymer, was waxy at room temperature.

EXAMPLE 3

A mixture of 202 grams (0.25 mole) of di-Alfol 22 itaconate, 24.5 grams (0.25 mole) of maleic anhydride and 6.8 grams (3 percent) of di-t-butyl peroxide was gradually heated to 130° C. with stirring. Heat was shut off at 130° C. The reaction was quite exothermic. The temperature rose rapidly to 150° C. and then dropped. The mixture became quite viscous, and the reaction was immediately discontinued. To the above copolymer were added 178.5 grams (0.5 mole) of Alfol 22 alcohol, 12.15 grams (3 percent) of p-toluene sulfonic acid, 363 grams of Process oil Promor No. 5 and 150 cc. of toluene. (Process oil Promor No. 5 is a conventional paraffin oil having a viscosity of 100 sec. at 100° F.) The mixture was gradually heated to 175° C. and was held there until water stopped coming over. The reaction product was filtered through Hyflo clay and topped to 200° C. under house vacuum. The final product, the di-Alfol 22 ester of di-Alfol 22 itaconate-maleic anhydride copolymer, which contained 50 percent Process oil, was waxy at room temperature.

EXAMPLE 4

A mixture of 94.25 grams (0.125 mole) of dibehenyl itaconate, 12.25 grams (0.125 mole) of maleic anhydride and 5.33 grams (5 percent) of di-t-butyl peroxide was gradually heated with stirring. Heating was turned off at 140° C. The reaction was exothermic. The temperature rose rapidly to 155° C. and then dropped. The reaction mixture was quite viscous, and the reaction was immediately discontinued. To the above copolymer were added 87 grams (0.25 mole + 8 grams excess) of Alfol 2022T alcohol, 9.7 grams (5 percent) of p-toluene sulfonic acid and 200 cc. of xylene. The mixture was refluxed at 145° C. for 3 hours and at 175° C. until water stopped completely coming over (about 2 hours). The reaction product was diluted with benzene, filtered and topped to 175° C. at 8 mm. The final product, the di-Alfol 2022T ester of dibehenyl itaconate-maleic anhydride copolymer, was waxy at room temperature.

The ester copolymers of examples 1 through 4 were subjected to ASTM Pour Test No. D-97 for determination of respective pour points. This test was applied against the uninhibited as well as against samples of the same oil containing the indicated concentrations of the respective ester copolymers produced in accordance with the foregoing examples 1 through 4. The test oils employed comprised an Amal crude oil and an Amal residual oil having a boiling point of 650° F.+. The results obtained are shown in the following table I.

TABLE I

| | ASTM Pour Test Results (ASTM Test No. D-97) | | | |
|---|---|---|---|---|
| | Amal Crude Oil | | Amal Residual Oil 650° F.+ | |
| Additive | Concn. Wt.% | Pour Point °F. | Concn. Wt.% | Pour Point °F. |
| Uninhibited fuel | 0.00 | 75 | 0.00 | 105 |
| Uninhibited fuel + Ex. 1 | 0.10 | 30 | 0.50 | 65 |
| Uninhibited fuel | 0.00 | 75 | 0.00 | 105 |
| Uninhibited fuel + Ex. 2 | 0.10 | 30 | 0.50 | 60 |
| Uninhibited fuel | 0.00 | 70 | 0.00 | 105 |
| Uninhibited fuel + Ex. 3 | 0.06 | 25 | 0.06 | 70 |
| Uninhibited fuel | 0.00 | 75 | 0.00 | 110 |
| Uninhibited fuel + Ex. 4 | 0.10 | 30 | 0.10 | 70 |

It will be apparent from the data set forth in the foregoing table I that the ester copolymers of the present invention are highly effective as fluidity improvers in liquid hydrocarbons. As will be understood, results will vary with respect to the specific ester copolymer employed. In order to accomplish any given improvement, many of the aforementioned ester copolymers can be employed in very small amounts. Others can be effectively employed in the aforementioned practical concentrations from about 0.05 to about 0.5 percent, by weight, of the liquid hydrocarbon composition.

To further demonstrate the efficacy of the novel ester copolymers of the present invention as fluidity improvers in liquid hydrocarbon, the individual ester copolymers were next blended into an Amal crude oil and an Amal residual oil of the type hereinbefore described and subjected to a series of tests for determination of fluidity characteristics by an evaluation of constant shear rates (94 sec.$^{-1}$) at 40° F. The test involves the use of a Ferranti-Shirley viscometer in which the cone is set on a plate sufficiently close to make electrical contact. The cone is rotated at a preset speed of 5 r.p.m., and the torque required to maintain this speed is recorded as a function of time. This test was applied against the uninhibited as well as against samples of the same oil containing the indicated concentrations of the respective ester copolymers produced in accordance with the foregoing examples 1 through 4. The results obtained are shown in the following table II.

TABLE II

Constant Shear Rate (94 sec.$^{-1}$) Test

| Additive | Conc. Wt.% | Amal Crude Oil | |
|---|---|---|---|
| | | Peak Shear Stress (Dynes/cm.$^2$) | Viscosity After 100 Sec. Shear Poise |
| Uninhibited fuel | 0 | 5,296 | 12,6 |
| Uninhibited fuel + Ex. 1 | 0.03 | 1,638 | 6.5 |
| Uninhibited fuel + Ex. 2 | 0.06 | 1,754 | 8.8 |
| Uninhibited fuel + Ex. 3 | 0.03 | 2,979 | 9.4 |
| Uninhibited fuel + Ex. 4 | 0.06 | 1,650 | 8.2 |

From the foregoing table II, it will be apparent that the ester copolymers of the present invention are highly effective as fluidity improvers in liquid hydrocarbons on the basis of constant shear rate evaluation.

Although the present invention has been described with preferred embodiments, it will be understood that various modifications and adaptations thereof may be resorted to without departing from the spirit and scope of the invention and that the liquid hydrocarbon compositions therein disclosed may contain other additive materials intended to enhance their properties.

We claim:

1. A liquid petroleum hydrocarbon selected from the group consisting of fuel oil, crude oil and residual oil, wherein said hydrocarbon contains a small amount, sufficient to improve its fluidity characteristics, of an ester of an alkyl itaconate-maleic anhydride copolymer and an alkanol, wherein the alkanol and alkyl portions of said copolymer each contain at least about 20 carbon atoms.

2. A composition as defined in claim 1 wherein said ester copolymer is present in an amount from about 0.001 percent to about 5 percent, by weight.

3. A composition as defined in claim 1 wherein said ester copolymer is present in an amount from about 0.05 percent to about 0.5 percent, by weight.

4. A composition as defined in claim 1 wherein said hydrocarbon comprises a fuel oil.

5. A composition as defined in claim 1 wherein said hydrocarbon comprises a crude oil.

6. A composition as defined in claim 1 wherein said hydrocarbon comprises a petroleum residual oil.

7. A composition as defined in claim 1 wherein the ester copolymer is the dibehenyl ester of dibehenyl itaconate-maleic anhydride copolymer.

* * * * *